United States Patent
Griffin et al.

[11] Patent Number: 6,031,492
[45] Date of Patent: *Feb. 29, 2000

[54] MOBILE CRADLE ANTENNA AND HEAT SINK ENHANCEMENT

[75] Inventors: Lee Daniel Griffin, Raleigh; Gerard James Hayes, Wake Forest, both of N.C.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/660,862

[22] Filed: Jun. 10, 1996

[51] Int. Cl.[7] .................................. H01Q 1/24; H04B 7/26
[52] U.S. Cl. .......................... 343/702; 343/713; 455/90; 455/575; 379/55.1
[58] Field of Search .................................... 343/702, 713, 343/711, 720; 379/55.1; 455/89, 90, 575; H01Q 1/24

[56] References Cited

U.S. PATENT DOCUMENTS

| | | | |
|---|---|---|---|
| 2,828,413 | 3/1958 | Bowers | 343/702 |
| 3,820,010 | 6/1974 | Sudmeier | 324/5 R |
| 4,286,335 | 8/1981 | Eichler et al. | 343/702 |
| 4,590,614 | 5/1986 | Erat | 343/702 |
| 4,850,006 | 7/1989 | Sasaki et al. | 379/58 |
| 5,020,136 | 5/1991 | Patsiokas et al. | 455/89 |
| 5,057,847 | 10/1991 | Vaisanen | 343/702 |
| 5,239,669 | 8/1993 | Mason et al. | 343/713 |
| 5,281,970 | 1/1994 | Blaese | 343/713 |
| 5,453,019 | 9/1995 | Garver et al. | 439/188 |

FOREIGN PATENT DOCUMENTS

| | | |
|---|---|---|
| 412852 | 2/1991 | European Pat. Off. . |
| 431640 | 6/1991 | European Pat. Off. . |
| 692885 | 1/1996 | European Pat. Off. . |
| 3537107 | 4/1987 | Germany . |
| WO89/04569 | 5/1989 | WIPO . |

OTHER PUBLICATIONS

Article: Carant Literature; Inventor: Carant Antenna B; Title Antenna Technique, Antenna Installation; 1995; pp. 1–45.

Primary Examiner—Michael C. Wimer
Attorney, Agent, or Firm—Burns, Doane, Swecker & Mathis, L.L.P.

[57] ABSTRACT

A cradle unit for use in transmitting radiocommunication signals from within a vehicle between a portable phone unit inside a vehicle and an external antenna connected to an exterior of the vehicle is provided with a heat sink for dissipating heat generated at the cradle unit, wherein the heat sink also functions as a dipole antenna for communicating with the portable phone. In addition, the cradle unit can be provided with circuitry for charging a battery of the portable phone, along with a hands-free unit, including a speaker and microphone. The heat sink antenna allows the portable phone to receive and transmit radio frequency signals as if it were directly RF-coupled to the external antenna, thereby avoiding a 10 dB attenuation loss normally associated with using a portable phone inside a vehicle due to the RF shielding of the metal vehicle body.

22 Claims, 3 Drawing Sheets

MOBILE CRADLE ANTENNA AND HEAT SINK ENHANCEMENT

BACKGROUND

The present invention relates generally to improved mobile communications and, more specifically, to a new mobile unit cradle including an antenna and heat sink combination for portable cellular phone vehicle kits.

With the proliferation of mobile communications, cellular phone operation has become commonplace in daily life. One prominent area of use for cellular phone technology is in connection with motor vehicles. As shown in FIG. 1, mobile communication is established through networks of base stations 20 which are set up to communicate with mobile units or stations in vehicles 10 such as cars. Today many vehicles include mobile phone kits. As shown in FIG. 2, these kits typically have a cradle 25 for a portable phone 27 and also include a hands-free unit 30 having a microphone 32 and a speaker 35 to allow a driver or passenger to communicate without having to pick up the portable phone 27.

It is well known today that the signal quality associated with the unaided use of portable phones inside an automobile or other vehicle will be severely degraded by the radio frequency (RF) shielding effect of the vehicle's metal body. Typically a vehiche's body can account for as much as 10 dB of RF attenuation when trying to use a portable phone inside a vehicle. In order to avoid this 10 dB vehicle shielding loss, an external antenna 40, also shown in FIG. 2, is commonly used. The portable phone 27 has an external antenna port (not shown) which allows its transmission circuitry to be connected to the cradle 25. The cradle 25 in turn is connected by cabling 50 to the external antenna 40. The external antenna 40 can, for example, be fabricated as a halfwave dipole with 3 dB of gain, and is attached to the outside body of the vehicle 55. The additional 3 dB gain associated with the external antenna is used to overcome a 3 dB loss generally associated with the RF cabling, connectors, and isolation devices between the portable phone 27 and the external antenna 40. Alternatively, an RF booster 60 may be used to overcome losses introduced by these elements.

Present methods for electrically connecting the portable phone to the external antenna take several approaches. One approach is the direct connection described above between the portable phone's external antenna port and an external antenna connector of the cradle unit. Capacitive or inductive coupling of the portable phone's antenna to the cradle antenna can also be used. However, each of these techniques for coupling the portable phone to the external antenna suffers from the dual drawbacks that the portable phone must be physically compatible with the cradle and that the portable phone must be physically positioned within the cradle to obtain the benefits associated with connection to the external antenna. Thus users are restricted in the manner in which they can use their portable phones within vehicles.

In other conventional vehicle kits, the cradle is omitted. For example, a portable phone's antenna can be used to transmit to, and receive RF signals from, a separate "in the vehicle" antenna which is directly, capacitively, or inductively connected to the external antenna on the opposite side of the wall 55 of the vehicle body as the external antenna 40. This technique also avoids the 10 dB vehicle body loss. However, in this configuration, the other benefits of the cradle are lost, such as the hands-free unit and battery charging circuitry for replenishing the portable phone's battery.

As mentioned above, vehicle kits also typically include hands-free units connected to the cradle 25. These kits provide hands-free operation through use of an external microphone 32 and speaker 35. Vehicle kits also typically include circuitry for recharging the portable phone's battery when the portable phone 27 is placed in the cradle 25. Some cradles are also provided with an RF transmitter booster and a low noise receiver that can be switched into the transmit/receive path between the portable phone 27 and the external antenna 40. However, these various circuits may generate a great deal of heat which in turn may impact the performance and lifetime of the cradle.

SUMMARY

As cradle units become smaller and smaller, the need to dissipate heat from the internal heat generating circuitry will increase. It is therefore an object of the invention to provide an improved cradle unit with a heat sink for dissipating heat generated by the circuitry within the cradle unit, wherein the heat sink also functions as an antenna which links a portable phone with an external vehicle antenna.

According to an exemplary embodiment of the present invention, the cradle antenna is formed as a dipole antenna, including two plates which also function as a heat sink for the heat generating circuitry of the cradle. The cradle antenna is able to receive radio signals from the portable phone when used within a vehicle and pass the received signal to the external vehicle antenna. This allows a portable phone to be used anywhere inside the vehicle (i.e., it need not be physically connected to or proximate the cradle) without suffering the 10 dB attenuation loss normally associated with the RF shielding of the vehicle body.

In addition, the cradle unit can be provided with circuitry for charging the battery of the portable phone along with a hands-free unit, including a speaker and microphone. The heat sink/antenna combination according to the present invention transfers heat away from this heat-generating circuitry, thereby improving the performance of the cradle unit.

BRIEF DESCRIPTION OF THE DRAWINGS

The foregoing, and other objects, features and advantages of the present invention will be understood by those skilled in the art reading the following description, in conjunction with the drawings, in which.

DETAILED DESCRIPTION

Figure 1:
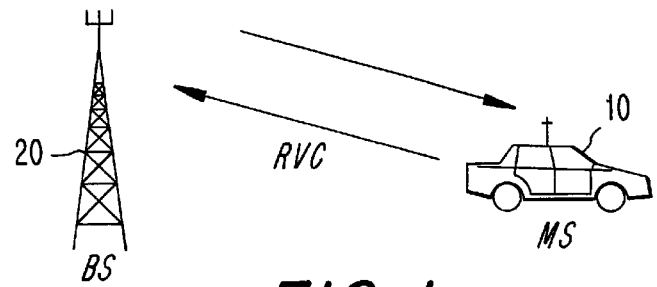
FIG. 1 depicts communication between a base station and a mobile station.
Figure 2:
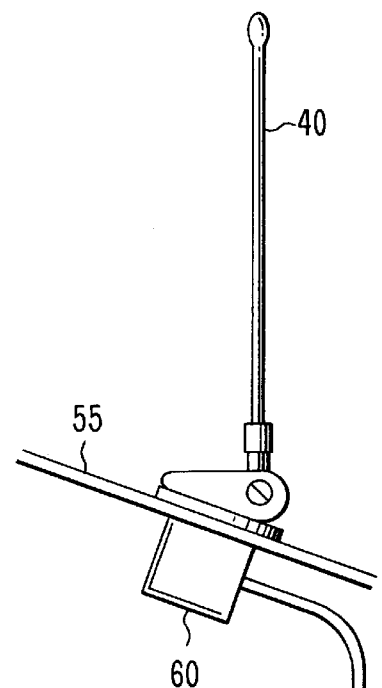
FIG. 2 is a block diagram of a conventional cradle unit connected to an external antenna.
Figure 2:
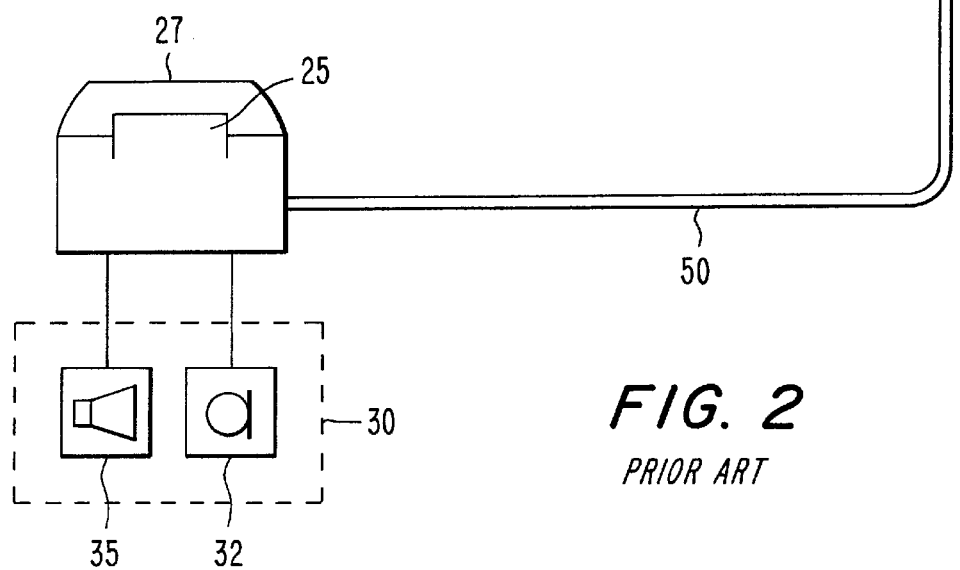
Figure 3:
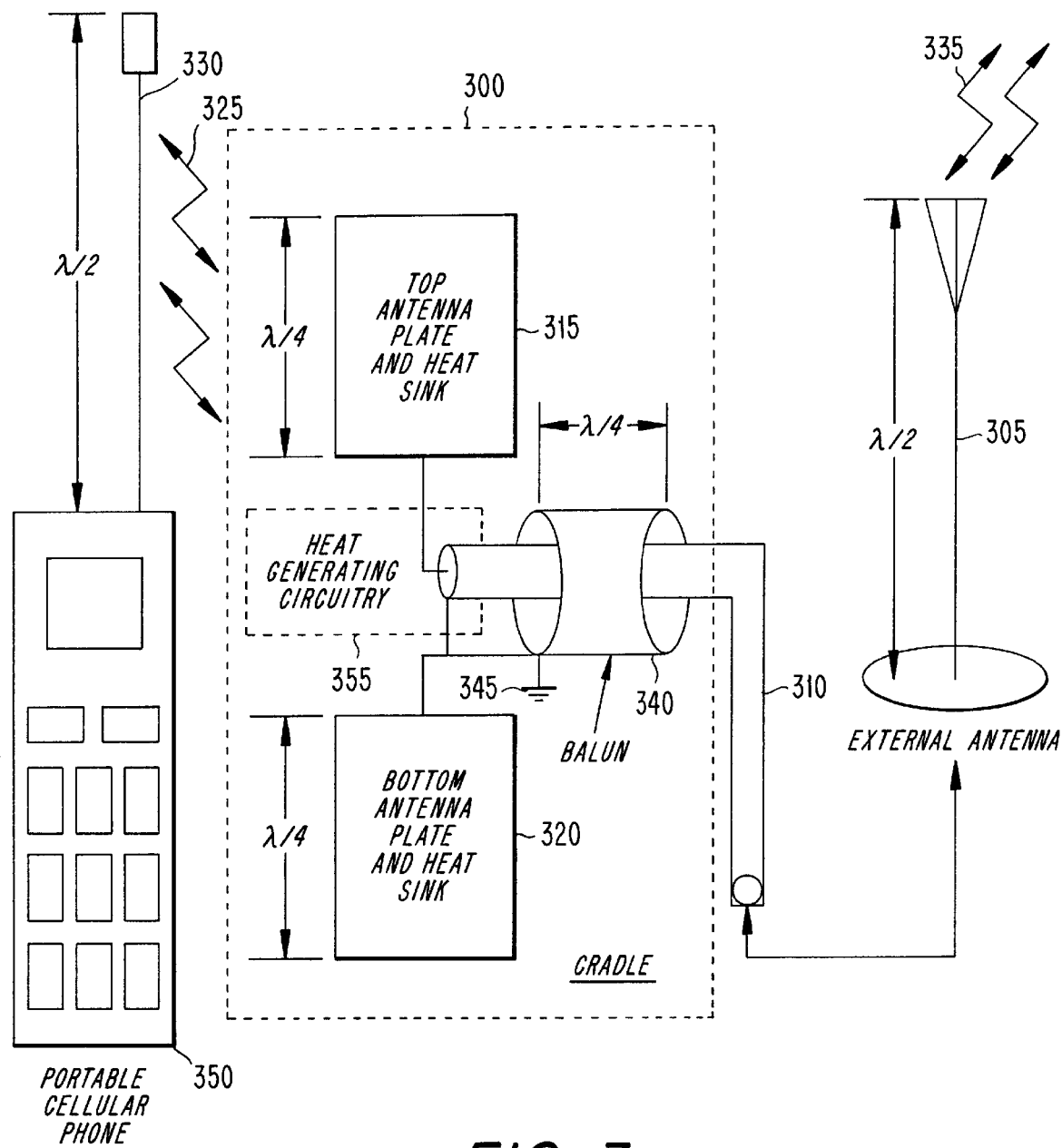
FIG. 3 is an exemplary block diagram of a cradle unit according to the present invention.

The various features of the present invention will now be described with respect to the figures. Turning to FIG. 3, an exemplary embodiment of the present invention is shown. According to this exemplary embodiment, a cradle unit 300 (disposed inside a vehicle or other structure) is connected to an external halfwave dipole antenna 305 located on the exterior of the vehicle. The connection between the cradle and the external antenna is accomplished by way of coaxial cable 310.

Disposed within the cradle 300 are two metallic plates 315 and 320 which jointly form a halfwave dipole antenna inside the cradle. The antenna comprising plates 315 and 320 is referred to herein as the "cradle antenna". Radiation 325 is transmitted to, and received from, a portable phone's antenna 320 by the cradle antenna and carried through the coaxial feed 310 to the external antenna 305, where it is radiated as signals 335. A quarter-wave balun 340 is also incorporated to provide for the electrical connection between the cradle antenna and the coaxial feed 310. As is well known to those skilled in the art, balun 340 matches the impedance of the cradle antenna to that of the coaxial cable 310. In addition, the bottom plate 320 of the cradle antenna is also connected to ground 345. This arrangement allows for the portable phone 350 (which may or may not have an external antenna port) to be RF-coupled with external vehicle antenna 305. According to this exemplary embodiment, no additional circuitry or adapter is needed to use the portable phone 350 with the cradle 300. The direct RF-coupling provided by the cradle antenna also allows the portable phone 350 to overcome the 10 dB attenuation associated with communication of a portable cellular phone inside the vehicle.

In addition to allowing a subscriber to freely use his or her portable phone within the confines of the vehicle, this exemplary embodiment also provides a heat sink allowing for the thermal transfer of heat away from the heat generating circuitry 355 within the cradle 300 to the RF antenna plates 315 and 320. Heat generating circuitry 355 can include, for example, battery charging circuitry for charging the battery (not shown) when the portable phone 350 is placed in the cradle 300. Also phone 350 generates heat and conducts heat to cradle 300. Note that the top and bottom antenna plates can be placed in any convenient location proximate the heat generating circuitry 355. The proximity of the antenna plates to the heat generating circuitry 355 provides for heat transfer away therefrom.

Figure 4:
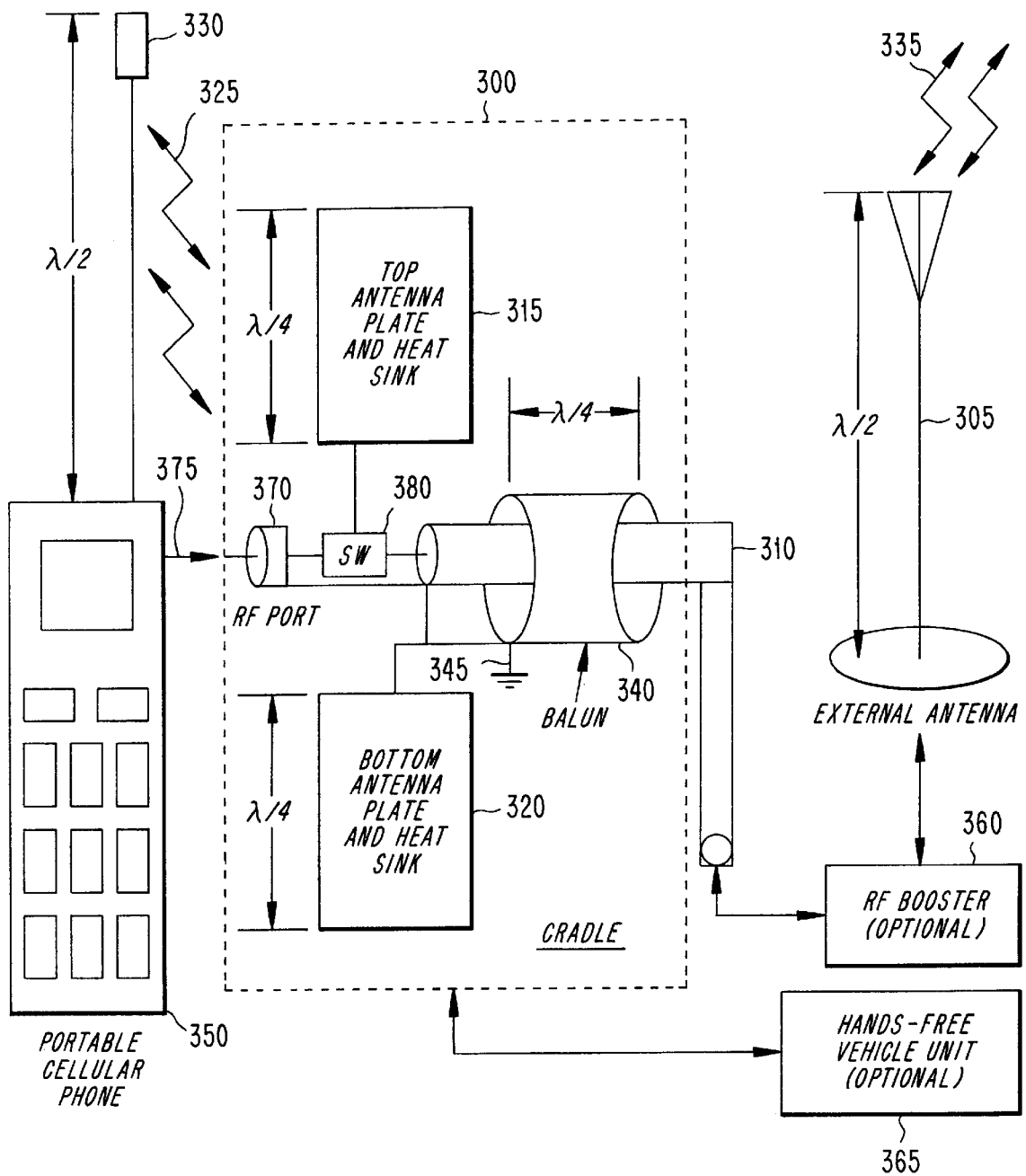
FIG. 4 is an alternate exemplary embodiment of the block diagram in FIG. 3, including an RF booster unit and hands-free unit.

Turning to FIG. 4, additional exemplary embodiments according to the present invention are shown. Therein, the same reference numerals used in FIG. 3 are used in FIG. 4 to refer to the same or similar elements. To overcome attenuation attributable to, for example, the coaxial cable 310 and connections to the external antenna 305, an in-line RF booster 360 can be placed between the portable phone 350 and the external antenna 305. Also, a hands-free unit 365 including microphone and loudspeaker (not shown) can be incorporated to allow communication with the external antenna 305 without removing the portable phone 350 from the cradle 300. The signal processing circuitry used to transform voice signals received by the hands-free unit 365 can be part of heat generating circuitry 355, i.e., arranged such that the top and bottom plates 315 and 320 are in proximity thereto so that the heat created by the signal processing circuitry associated with the hands-free vehicle unit 365 can be dissipated.

In addition, cradle 300 can be provided with an RF port 370. This allows an external antenna port 375 of the cellular phone 350 to be directly connected to the cradle 300 and thus the external antenna 340. This usage of the external antenna port 375 disconnects the phone antenna 330. When the cradle 300 is used in this manner, the cradle antenna and phone's antenna 330 are not used (i.e., they are deactivated). Thus, according to this exemplary embodiment of the present invention, when the RF port 370 is engaged, a switch 380 removes the top antenna plate 315 from the circuit. In this way, the top plate 315 retains its role as a heat sink without affecting the radiocommunication signals received from the portable phone 350 via the RF port 370. The bottom antenna plate 320 remains connected to the circuit but, since it is grounded, the bottom plate 320 and the balun 340 are electrically transparent to signals passed from the portable phone 350 when it is connected to the RF port 370. Switch 380 can be implemented using any type of switch known to those skilled in the art, e.g., a direct snap connection wherein a pin (not shown) associated with the external antenna port 375 of the portable phone 350 actuates switch 370 when plugged into the cradle RF port 370.

Thus, the present invention provides a mechanism for enhancing the portable phone antenna's transmitting and reception ability to overcome the 10 dB loss associated with communication from inside the vehicle without requiring the portable phone to be physically attached to the cradle. Moreover, the cradle antenna provides another benefit by also serving as a heat sink for the cradle's internal circuitry. Additionally, the portable phone's antenna (e.g., antenna 330) is still fully operable and the phone's electronics require no modification to implement the present invention. Furthermore, arrangements according to the present invention can be implemented using portable phones with or without external antenna ports.

It will be apparent to those skilled in the art that modifications to the exemplary embodiments can be made without departing from the scope or spirit of the invention. For example, the arrangement of the antenna can be varied within the cradle by placing the antenna plates in different configurations, such as a bent or diagonal arrangement, to accommodate the size of the cradle and its thermal mass (i.e., make antenna plates 315, 320 wider) and the location of the heat generating circuitry. In addition, the cradle antenna can be connected directly, capacitively, or inductively to the external antenna.

The present invention has been described by way of example, and modifications and variations of the exemplary embodiments will suggest themselves to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A unit for use in radiocommunication from within a vehicle via a first antenna connected to an exterior of the vehicle, the unit comprising:

a portable phone including circuitry for transmitting and receiving radiocommunication signals through a second antenna connected to the portable phone;

a cradle connected to said first antenna and adapted to receive the portable phone, said cradle including heat-generating circuitry; and a heat sink disposed in the cradle for sinking heat generated by the heat-generating circuitry, wherein the heat sink is configured as a third antenna for receiving said radiocommunication signals from the portable phone and passing the radiocommunication signals to the first antenna.

2. A unit according to claim 1, wherein the third antenna also transmits downlink radiocommunication signals received from the first antenna and transmits said downlink radiocommunication signals to the second antenna of the portable phone.

3. A unit according to claim 1, wherein the heat-generating circuitry includes circuitry for charging a battery of the portable phone.

4. A unit according to claim 1, wherein the unit includes a hands-free device including a speaker and a microphone.

5. A unit according to claim 1, wherein the heat sink configured as the third antenna is a dipole antenna including a top plate and a bottom plate.

6. A unit according to claim 5, wherein the cradle includes a first RF port for connection to a second RF port of the portable phone, and wherein the first RF port is connected to the first antenna.

7. A unit according to claim 6, wherein the cradle further comprises a switch for disabling the top plate of the dipole antenna when the portable phone is connected to the first RF port.

8. A unit according to claim 1, wherein the connection from the cradle to the first antenna includes an RF booster.

9. A cradle for receiving a detachable and separably operable portable phone, said cradle comprising:
   a first plate configured to sink heat from heat generating circuitry within the cradle; and
   a second plate configured to sink heat from said heat generating circuitry;
   wherein said cradle is adapted to couple with the portable phone; and
   wherein the first plate and the second plate form a cradle antenna for transmitting to said portable phone, radio frequency communications received from an antenna external to said cradle and for receiving radio frequency communications from the portable phone and transmitting them to said external antenna.

10. A cradle according to claim 9, wherein the heat generating circuitry includes a device for charging a battery of the portable phone.

11. A cradle according to claim 9, wherein the heat generating circuitry includes signal processing circuitry associated with a hands-free device.

12. The cradle according to claim 9, wherein the cradle further comprises a radio frequency port for connection with the portable phone and if the portable phone is connected to the radio frequency port, then the portable phone's antenna and the first plate are deactivated.

13. A cradle according to claim 9, wherein the portable phone includes an antenna separate from the cradle antenna, and the cradle antenna is located external to the portable phone.

14. A cradle for receiving a detachable and separably operable portable phone, said cradle comprising:
   a ground;
   a first plate configured to sink heat from heat generating circuitry within the cradle; and
   a second plate configured to sink heat from said heat generating circuitry;
   wherein said cradle is adapted to couple with the portable phone; and
   wherein the first plate and the second plate form a cradle antenna for transmitting radio frequency communications received from an antenna external to said cradle to said portable phone and receiving radio frequency communications from the portable phone and transmitting them to said external antenna, wherein the second plate is grounded and is connected to a balun forming a quarter wave monopole worked against the ground.

15. A cradle according to claim 14, wherein the portable phone includes an antenna separate from the cradle antenna, and the cradle antenna is located external to the portable phone.

16. A cradle for receiving a detachable and separably operable portable phone, said cradle comprising:
   a first plate configured to sink heat from heat generating circuitry within the cradle; and
   a second plate configured to sink heat from said heat generating circuitry; and
   wherein said cradle is adapted to couple with the portable phone; and
   wherein the first plate and the second plate form a dipole antenna for transmitting and receiving radio frequency communications between the portable phone and an external antenna, wherein the cradle includes a radio frequency port for connection to a radio frequency port of the portable phone, wherein the cradle radio frequency port is also connected to the external antenna.

17. A cradle according to claim 16, wherein the cradle further comprises a switch for disabling the first plate of the dipole antenna when the portable phone is connected to the cradle radio frequency port.

18. A cradle according to claim 16, wherein the connection from the cradle to the external antenna includes a radio frequency booster.

19. A cradle according to claim 13, wherein the portable phone includes an antenna separate from the cradle antenna, and the cradle antenna is located external to the portable phone.

20. A cradle for receiving a detachable and separably operable portable phone, said cradle including a heat sink for dissipating heat energy, wherein said cradle is adapted to couple with the portable phone, and wherein the heat sink also functions as a cradle antenna electrically connected to receive radio frequency signals from the portable phone and transfer said radio frequency signals to an external antenna.

21. The cradle of claim 20, wherein the heat sink is also able to transmit radio frequency signals received from the external antenna to the portable phone.

22. A cradle according to claim 20, wherein the portable phone includes an antenna separate from the cradle antenna, and the cradle antenna is located external to the portable phone.

* * * * *